(12) United States Patent
Chang et al.

(10) Patent No.: US 11,454,987 B2
(45) Date of Patent: Sep. 27, 2022

(54) SELF-DRIVING COORDINATION SYSTEM AND CONTROL METHOD THEREOF

(71) Applicant: AUTOMOTIVE RESEARCH & TESTING CENTER, Changhua Hsien (TW)

(72) Inventors: Wei-Hsuan Chang, Changhua Hsien (TW); Rong-Terng Juang, Changhua Hsien (TW)

(73) Assignee: AUTOMOTIVE RESEARCH & TESTING CENTER, Changhua Hsien (TW)

( * ) Notice: Subject to any disclaimer, the term of this patent is extended or adjusted under 35 U.S.C. 154(b) by 179 days.

(21) Appl. No.: 16/728,449

(22) Filed: Dec. 27, 2019

(65) Prior Publication Data
US 2021/0200242 A1    Jul. 1, 2021

(51) Int. Cl.
*G05D 1/02*   (2020.01)
*G05D 1/00*   (2006.01)

(52) U.S. Cl.
CPC ......... *G05D 1/0295* (2013.01); *G05D 1/0088* (2013.01); *G05D 1/027* (2013.01); *G05D 1/0248* (2013.01); *G05D 1/0285* (2013.01); *G05D 2201/0213* (2013.01)

(58) Field of Classification Search
CPC .. G05D 1/0295; G05D 1/0088; G05D 1/0248; G05D 1/027; G05D 1/0285; G05D 2201/0213
See application file for complete search history.

(56) References Cited

U.S. PATENT DOCUMENTS

| | | | |
|---|---|---|---|
| 10,134,182 B1* | 11/2018 | Ma | G06T 15/005 |
| 2006/0274149 A1* | 12/2006 | Yoshizawa | G01S 13/867 |
| | | | 348/148 |
| 2015/0168560 A1* | 6/2015 | Ralphs | G01S 19/14 |
| | | | 701/23 |
| 2019/0339716 A1* | 11/2019 | Kopischke | B60W 50/14 |
| 2020/0341476 A1* | 10/2020 | Wuthishuwong | B60W 30/09 |
| 2020/0393847 A1* | 12/2020 | Govindan | G01C 21/3664 |

* cited by examiner

Primary Examiner — Rami Khatib
Assistant Examiner — Shahira Baajour
(74) Attorney, Agent, or Firm — Rabin & Berdo, P.C.

(57) ABSTRACT

A self-driving coordination system and the control method thereof are disclosed. The system and the control method are applied to an all-self-driving vehicle fleet. The self-driving coordination system comprises a leader control device, a follower control device, and a server. The leader control device is mounted in a leader. The follower control device is mounted in a follower. The leader control device and the follower control device communicate with each other for bidirectional data transmission. The server communicates with the leader control device and the follower control device for respective bidirectional data transmission.

5 Claims, 11 Drawing Sheets

SELF-DRIVING COORDINATION SYSTEM AND CONTROL METHOD THEREOF

BACKGROUND OF THE INVENTION

1. Field of the Invention

The present invention relates generally to a coordination system, and more particularly to a self-driving coordination system and control method thereof.

2. Description of Related Art

Based on the requirement of mass transportation, such as the public transportation between two places, the transportation service providers may dispatch several vehicles (such as cars) to build a vehicle fleet, the vehicles thereof heading to the same destination. In general, the vehicle fleet includes a leader and one or multiple followers. The leader is the first vehicle of the vehicle fleet. The followers follow the leader. Traditionally, the leader and the followers are driven by human drivers. Due to the increasing cost of manpower, the transportation service providers may want to replace the human drivers of the followers with computers. The leader is still driven by a human driver. The followers are driven by computer and just perform vehicle following. Therefore, because the human drivers of the followers are replaced with the computers, the cost in manpower would be reduced as a whole.

As minimization of the transportation cost has always been the goal for the transportation service providers. It is necessary to provide a better solution for the mass transportation.

SUMMARY OF THE INVENTION

An objective of the present invention is to provide a self-driving coordination system. A high-level self-driving vehicle and lower-level self-driving vehicles are organized in a vehicle fleet, such that the vehicle fleet may operate at a lower cost. The vehicle fleet may be applied to the public transportation or freight transportation at commercial harbors.

The self-driving coordination system of the present invention is applied to an all-self-driving vehicle fleet having a leader and a follower, wherein the leader goes forward along a commanded path and the follower follows the leader. The self-driving coordination system comprises a leader control device, a follower control device, and a server. The leader control device is mounted in the leader and comprises an advanced collecting unit for collecting driving information, a leader communication unit, and a leader decision-making and control unit. The leader communication unit comprises a leader vehicle-to-vehicle communication module and a leader mobile telecommunication module. The leader decision-making and control unit is electrically connected to the advanced collecting unit and the leader communication unit. The follower control device is mounted in the follower and comprises a simplified collecting unit for collecting driving information, a follower communication unit, and a follower decision-making and control unit. The follower communication unit comprises a follower vehicle-to-vehicle communication module and a follower mobile telecommunication module, wherein the follower vehicle-to-vehicle communication module of the follower communication unit communicates with the leader vehicle-to-vehicle communication module of the leader communication unit for bidirectional data transmission. The follower decision-making and control unit is electrically connected to the simplified collecting unit and the follower communication unit. The server communicates with the mobile telecommunication modules of the leader communication unit and the follower communication unit for respective bidirectional data transmission.

Another objective of the present invention is to provide a self-driving coordination control method that is performed by a self-driving coordination system applied to an all-self-driving vehicle fleet having a leader and a follower. The leader goes forward along a commanded path and the follower follows the leader. The self-driving coordination system comprises a leader control device mounted in the leader and a follower control device mounted in the follower. The leader control device comprises an advanced collecting unit, a leader communication unit, and a leader decision-making and control unit. The follower control device comprises a simplified collecting unit, a follower communication unit, and a follower decision-making and control unit. The self-driving coordination control method comprises steps of receiving a follower driving information by the leader decision-making and control unit; receiving a leader driving information by the follower decision-making and control unit; receiving the leader driving information and the follower driving information by the server; and driving the follower by the follower decision-making and control unit according to the leader driving information.

In conclusion, the driving information is transmitted among the leader control device, the follower control device, and the server for the purpose of coordination. The communication link formed by the leader control device, the follower control device, and the server is like a ring. The vehicles will communicate with each other. The self-driving coordination system of the present invention can understand the status of the communication link through the method. When any one of the vehicles in the all-self-driving vehicle fleet has some fails to the communication link, the self-driving coordination system will detect the information of the fails immediately. In addition, human drivers do not involve in driving the all-self-driving coordination system, thereby the cost in manpower is reduced. In addition, because the follower control unit has the simplified collecting unit that is less costly, the followers in the all-self-driving vehicle fleet may economically follow the leader.

DETAILED DESCRIPTION OF PREFERRED EMBODIMENT(S)

Figure 1:
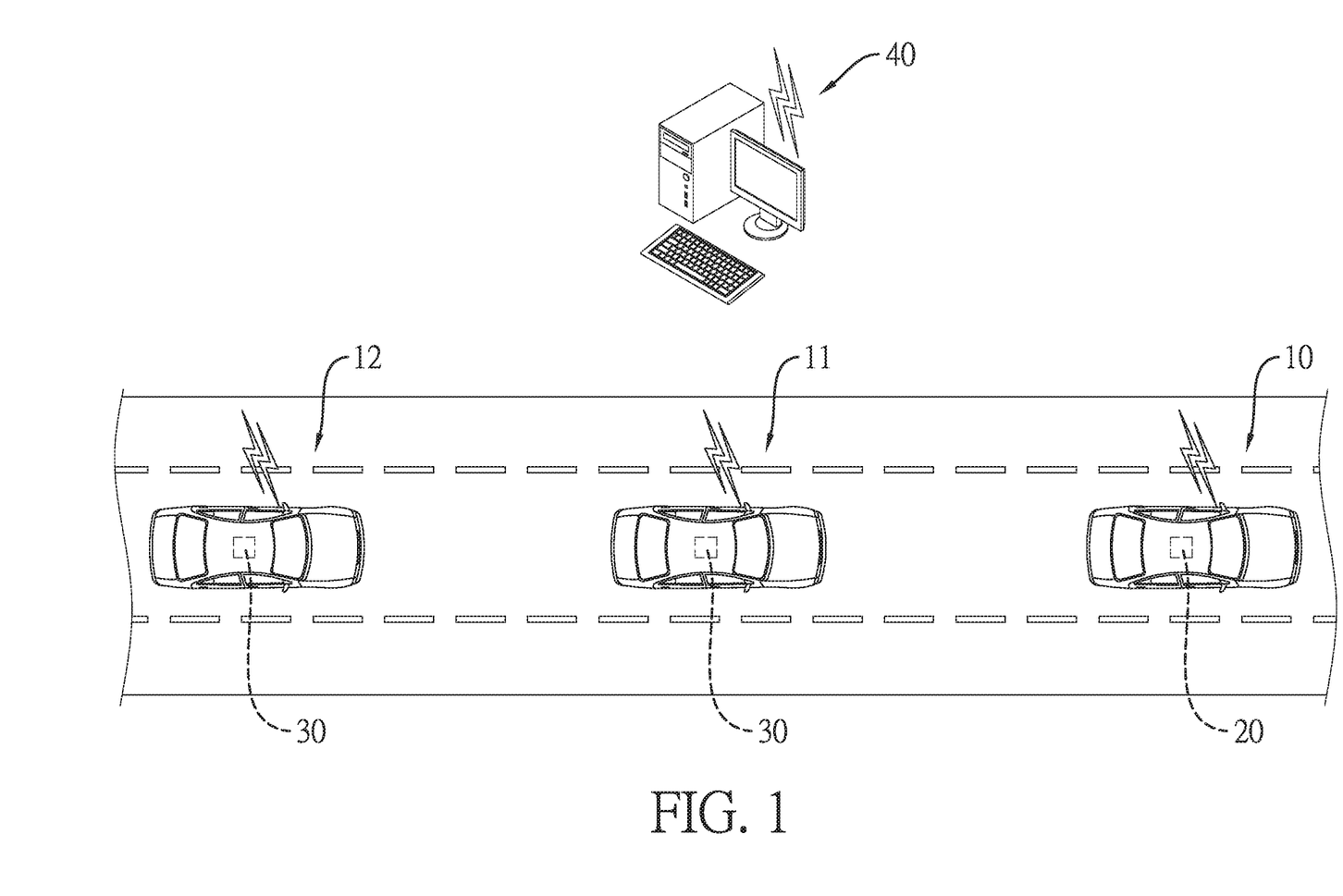
FIG. 1 is a schematic diagram of an embodiment of the self-driving coordination system of the present invention applied in an all-self-driving vehicle fleet.

The self-driving coordination system of the present invention may be applied to an all-self-driving vehicle fleet. With reference to FIG. 1, the vehicle fleet comprises a leader 10 and at least one follower. The at least one follower in the example of FIG. 1 comprises a first follower 11 and a second follower 12. The leader 10 and the followers 11, 12 go forward along a commanded path. The first follower 11 follows the leader 10. The second follower 12 follows the first follower 11. The all-self-driving vehicle fleet may drive under simple and controllable road conditions. For example, the all-self-driving vehicle fleet may be applied to the public transportation or the freight transportation at commercial harbors. It is to be noted that the leader 10 and the followers 11, 12 are also called unmanned cars. In other words, the leader 10 and the followers 11, 12 are self-driving vehicles and human drivers do not intervene in the driving.

Figure 2:
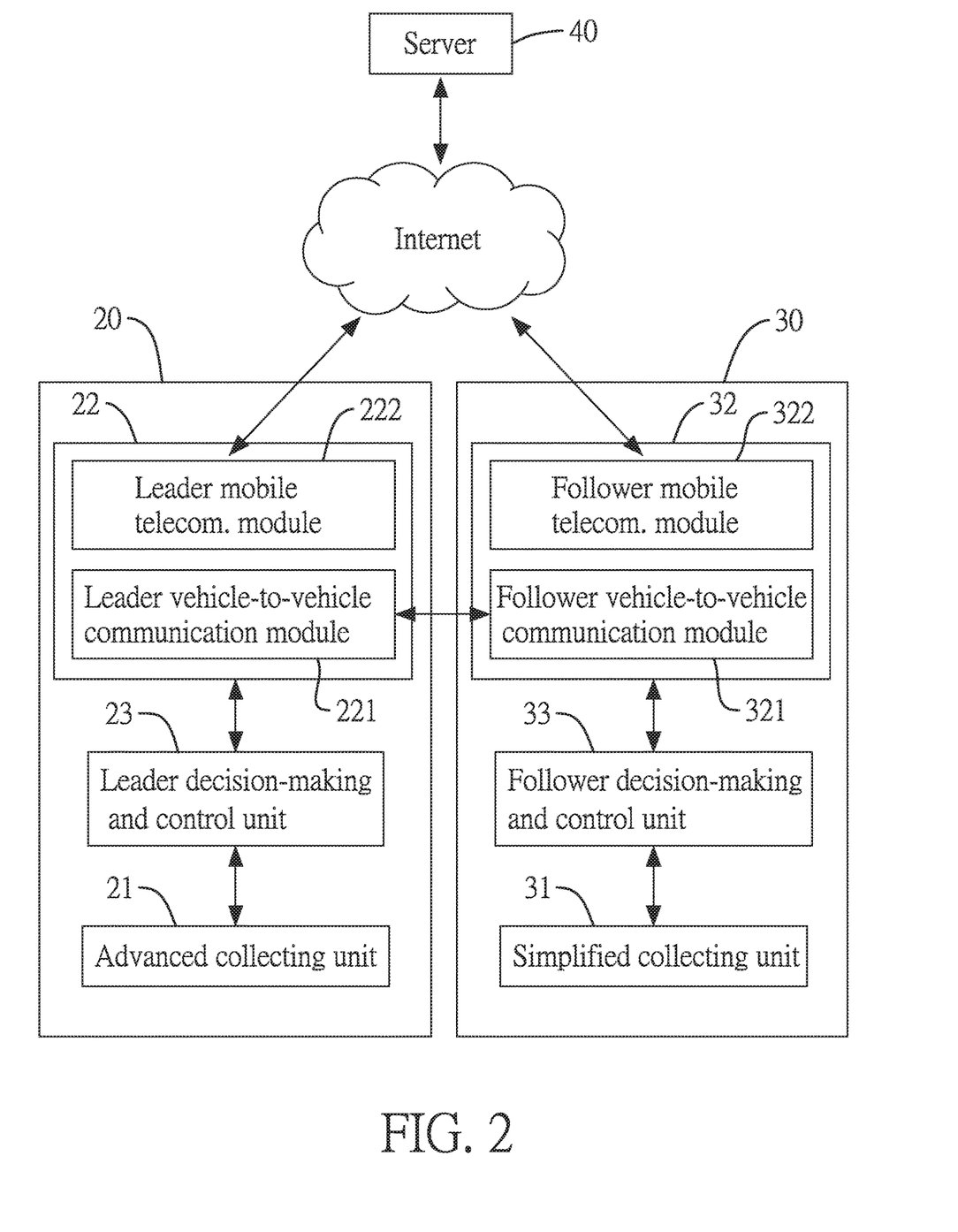
FIG. 2 is a block diagram of an embodiment of the self-driving coordination system of the present invention.

With reference to FIGS. 1 and 2, an embodiment of the self-driving coordination system of the present invention comprises a leader control device 20, at least one follower control device 30, and a server 40. The leader control device 20 is mounted in the leader 10. The follower control device 30 is mounted in the follower, such that each one of the followers 11, 12 is equipped with the follower control device 30. The server 40 may be a remote server or a cloud server installed in a server room or an office. The server 40 may designate the commanded path for the leader 10 and the followers 11, 12 to monitor and control the drive conditions for the all-self-driving vehicle fleet.

The leader control device 20 comprises an advanced collecting unit 21 for collecting driving information, a leader communication unit 22, and a leader decision-making and control unit 23. The leader communication unit 22 comprises a leader vehicle-to-vehicle communication module 221 and a leader mobile telecommunication module 222. The leader decision-making and control unit 23 may be an electronic control unit (ECU) electrically connected to the advanced collecting unit 21 and the leader communication unit 22.

The follower control device 30 comprises a simplified collecting unit 31 for collecting driving information, a follower communication unit 32, and a follower decision-making and control unit 33. The follower communication unit 32 comprises a follower vehicle-to-vehicle communication module 321 and a follower mobile telecommunication module 322. The follower vehicle-to-vehicle communication module 321 of the follower communication unit 32 communicates with the leader vehicle-to-vehicle communication module 221 of the leader communication unit 22 for bidirectional data transmission. The vehicle-to-vehicle communication modules 221, 321 of the leader communication unit 22 and the follower communication unit 32 are dedicated short range communication (DSRC) modules. Alternatively, in other embodiments, the vehicle-to-vehicle communication modules 221, 321 may directly or indirectly communicate to each other via fourth generation (4G) mobile telecommunication, fifth generation (5G) mobile telecommunication, or next generation mobile telecommunication. The follower decision-making and control unit 33 may be an electronic control unit (ECU) electrically connected to the simplified collecting unit 31 and the follower communication unit 32.

The server 40 communicates with the mobile telecommunication modules 222, 322 of the leader communication unit 22 and the follower communication unit 32 for respective bidirectional data transmission.

The mobile telecommunication modules 222, 322 of the leader communication unit 22 and the follower communication unit 32 may communicate with the Internet via 4G mobile telecommunication, 5G mobile telecommunication, or next generation mobile telecommunication. For example, the mobile telecommunication modules 222, 322 each respectively have a subscriber-identity-module (SIM) card provided by a telecom service provider for communicating with the Internet, and thus communicate with the server 40 via the Internet.

As mentioned above, the leader control device 20 and the follower control device 30 communicate with each other. The server 40 communicates with the leader control device 20 and the follower control device 30. Hence, based on the communication among the leader control device 20, the follower control device 30, and the server 40, the driving information of the leader 10 and the followers 11, 12 in the all-self-driving vehicle fleet may be transmitted to the leader control device 20, the follower control device 30, and the server 40 for the purpose of coordination. Time interval for transmitting the driving information between the leader control device 20 and the follower control device 30 may be hundreds milliseconds. The present invention makes the driving smooth, comfortable, and safe at a lower cost.

Figure 3:
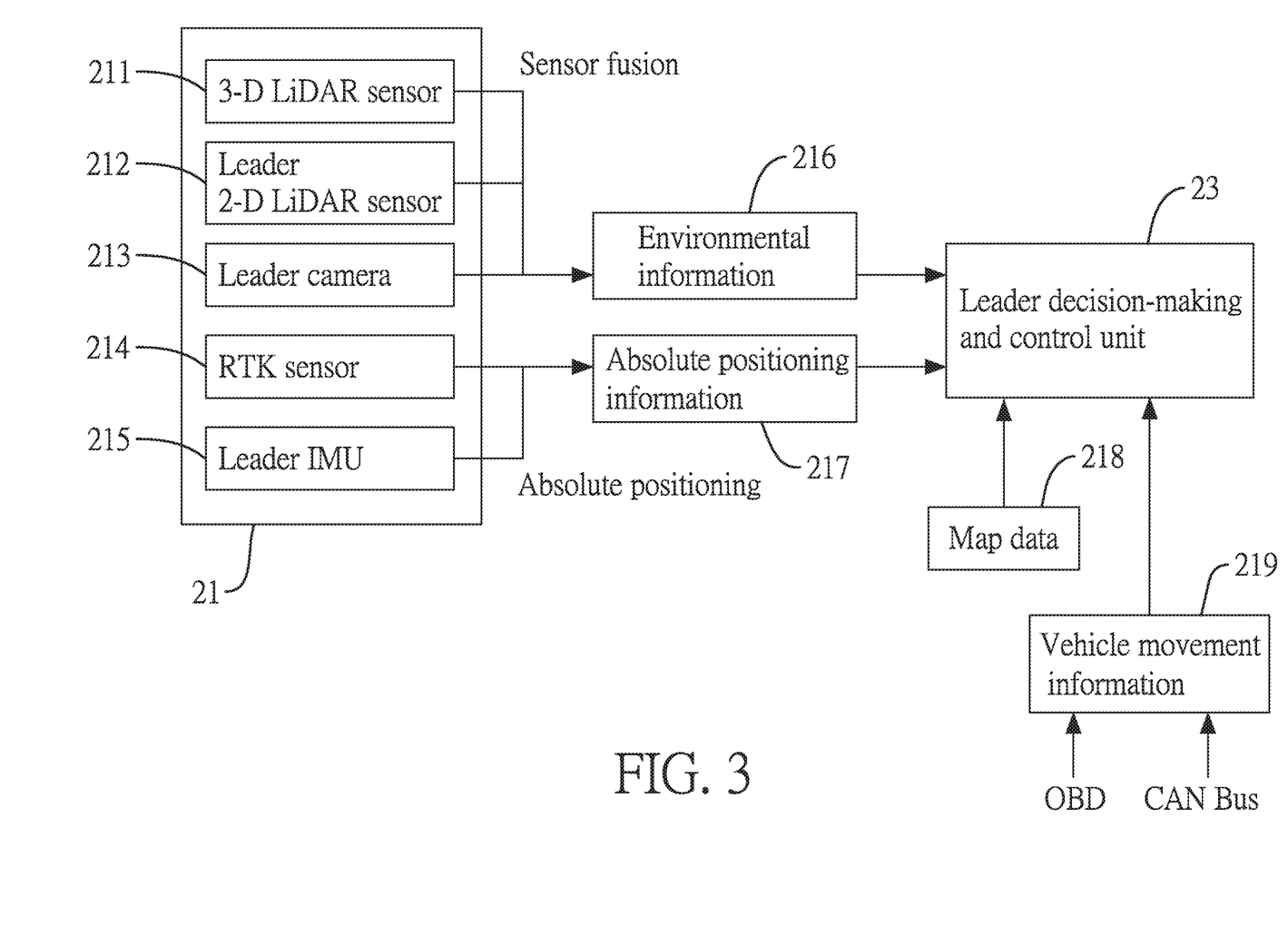
FIG. 3 is a block diagram of an embodiment of the leader control device of the self-driving coordination system of the present invention.

With reference to FIGS. 1, 2 and 3, the advanced collecting unit 21 comprises leader distance sensors, a leader camera 213, a real-time kinematic (RTK) sensor 214, and a leader inertial measurement unit (IMU) 215. The leader distance sensors may be optical distance sensors to measure the distance to a target by illuminating laser light to a target and measuring the reflected light from the target. For example, the leader distance sensors may include a three-dimensional light detection and ranging (LiDAR) sensor 211 and a leader two-dimensional LiDAR sensor 212. The three-dimensional LiDAR sensor 211 may be mounted on the roof of the leader 10. The leader two-dimensional LiDAR 212 may be mounted around the leader 10. The leader camera 213 may be mounted inside or outside the leader 10. The three-dimensional LiDAR sensor 211, the leader two-dimensional LiDAR 212, and the leader camera 213 detect the environmental condition in front of, behind, and beside the leader 10 to obtain an environmental information 216 and further provide the environmental information 216 to the leader decision-making and control unit 23. The RTK sensor 214 may determine the absolute position coordinate of the leader 10 and provides the absolute position coordinate of the leader 10 to the leader decision-making and control unit 23. The leader IMU 215 comprises a gyroscope and an accelerometer to measure the attitude of the leader 10 and provide the attitude of the leader 10 to the leader decision-making and control unit 23. That is, the leader decision-making and control unit 23 estimates an absolute positioning information 217 of the leader 10 with the absolute position coordinate and the attitude of the leader 10. The leader decision-making and control unit 23 may store a map data 218 that may be downloaded from the server 40 via the leader mobile telecommunication module 222. The leader decision-making and control unit 23 may be electrically connected to the on-board diagnostics (OBD) system or the controller area network bus (CAN Bus) of the leader 10 to acquire a vehicle movement information 219 such as the vehicle speed, the steering angle, the following distance, the acceleration, and so on.

The server 40 may transmit the commanded path to the leader decision-making and control unit 23 and the leader decision-making and control unit 23 control the leader 10 to drive to the destination according to the commanded path. The leader decision-making and control unit 23 may determine whether the leader 10 is moving on the commanded path according to the environmental information 216, the absolute positioning information 217, and the map data 218.

Figure 4:
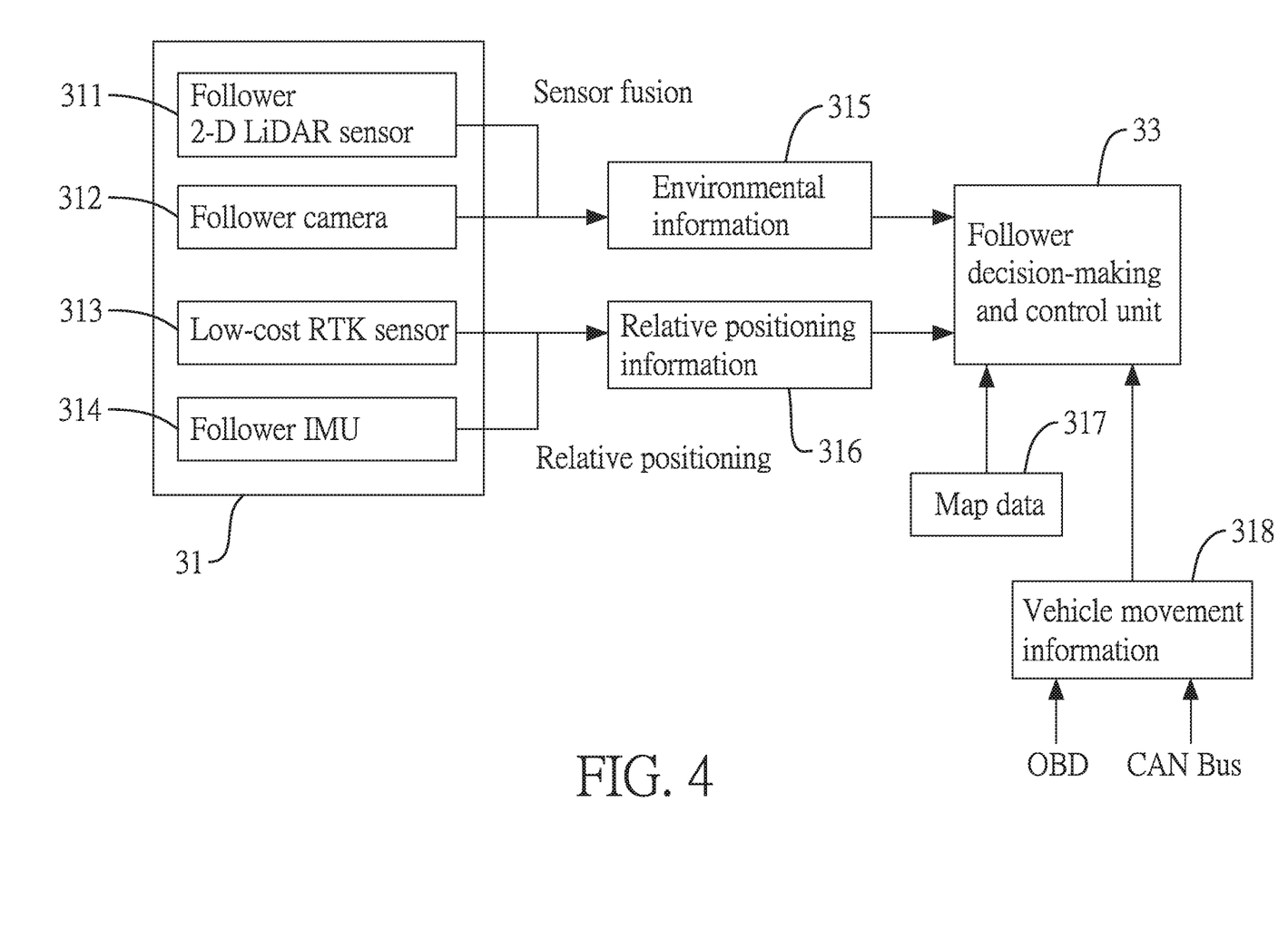
FIG. 4 is a block diagram of an embodiment of the follower control device of the self-driving coordination system of the present invention.

Compared with the simplified collecting unit 31, the advanced collecting unit 21 has higher level compositions and functions. As a result, the manufacturing cost and the price of the simplified collecting unit 31 are both lower than those of the advanced collecting unit 21. For example, the simplified collecting unit 31 has less compositions or simpler functions than the advanced collecting unit 21. In an embodiment, the simplified collecting unit 31 includes four or less than four selected from the group consisting of a follower distance sensor, a follower camera 312, a low-cost RTK sensor 313, and a follower IMU 314. The cost of the low-cost RTK sensor 313 is lower than the cost of the RTK sensor 214 of the advanced collecting unit 21 and thus the low-cost RTK sensor 313 has lower-level functions. The follower distance sensor may be an optical distance sensor to measures the distance to a target by illuminating laser light to a target and measuring the reflected light from the target. For example, the follower distance sensor may be a follower two-dimensional LiDAR sensor 311 or other LiDAR sensor that has lower cost than the follower two-dimensional LiDAR sensor 311.

In an embodiment of the present invention, with reference to FIGS. 1 and 4, the simplified collecting unit 31 includes the follower two-dimensional LiDAR sensor 311, the follower camera 312, the low-cost RTK sensor 313, and the follower IMU 314. The follower two-dimensional LiDAR sensor 311 may be mounted on the first follower 11 where the follower two-dimensional LiDAR sensor 311 performs best scan, such as around the first follower 11 to scan the back of the leader 10. Similarly, another follower two-dimensional LiDAR sensor may be mounted on the second follower 12 where the follower two-dimensional LiDAR sensor performs best scan, such as around the second follower 12 to scan the back of the first follower 11. The follower two-dimensional LiDAR 311 and the follower camera 312 detect the environmental condition to obtain an environmental information 315 and provide the environmental information 315 to the follower decision-making and control unit 33. The follower decision-making and control unit 33 may determine a relative positioning information 316 of the first follower 11 relative to the leader 10 according to the information provided by the low-cost RTK sensor 313 and the follower IMU 314. For example, the low-cost RTK sensor 313 may determine the position coordinate of the first follower 11. The follower IMU 314 measures the attitude of the first follower 11. The follower decision-making and control unit 33 may receive the absolute positioning information 217 of the leader 10 via the follower vehicle-to-vehicle communication module 321 or the follower mobile telecommunication module 322, and further compare the absolute positioning information 217. Therefore, the follower decision-making and control unit 33 may determine the relative positioning information 316 according to the position coordinate and the attitude of the first follower 11. The coordinate information generated by the follower two-dimensional LiDAR 311 may be applied to determine the relative positioning information 316 (to be described later). The follower decision-making and control unit 33 may store a map data 317 which received from the server 40 or the leader decision-making and control unit 23. The follower decision-making and control unit 33 may be electrically connected to the OBD system or the CAN Bus of the first follower 11 to acquire a vehicle movement information 318 such as the vehicle speed, the steering angle, the following distance, the acceleration, and so on.

As mentioned above, the driving information of the leader 10 collected by the leader decision-making and control unit 23 includes the environmental information 216, the absolute positioning information 217, the map data 218, and the vehicle movement information 219. The leader decision-making and control unit 23 may transmit such driving information of the leader 10 to the follower decision-making and control unit 33 and the server 40. It is to be noted that a leader local time is included in corresponding transmitted driving information of the leader 10. Hence, the follower decision-making and control unit 33 and the server 40 may obtain a timestamp according to the leader local time the leader 10. The follower decision-making and control unit 33 may compute a time shift of information transmitted as a reference for making decisions, wherein the time shift of information transmitted may be the difference between the instant local time of the first follower 11 and the leader local time included in the received driving information. It is to be noted that the leader local time and the follower local time are synchronous to each other. Similarly, the follower decision-making and control unit 33 may transmit the driving information of the first follower 11 with the instant follower local time to the leader decision-making and control unit 23 and the server 40, and the leader decision-making and control unit 23 may compute the time shift of information transmission.

Figure 5:
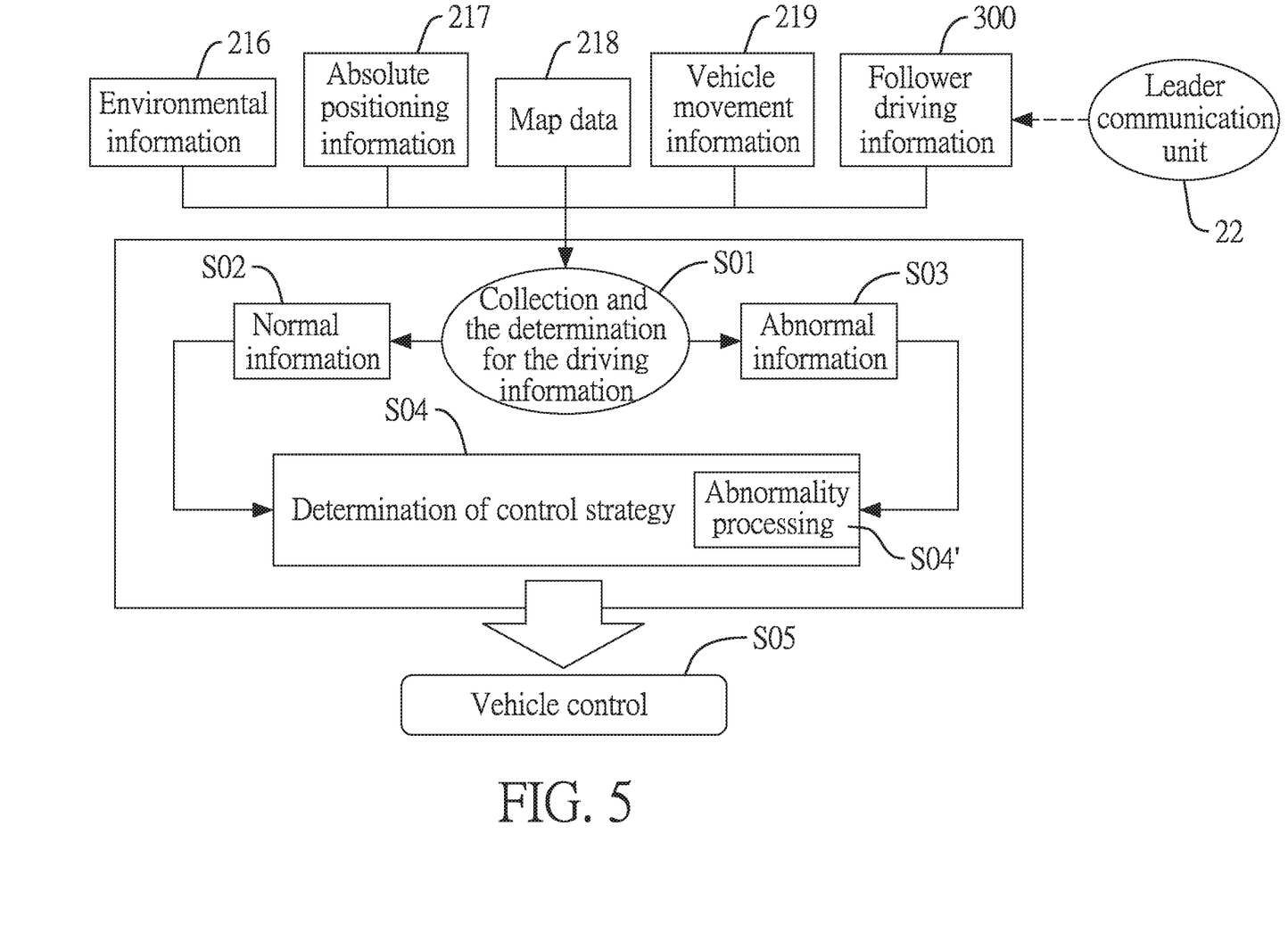
FIG. 5 is a flow chart of making a decision and control performed by the leader decision-making and control unit of the present invention.

With reference to FIG. 5, a flow chart performed by the leader decision-making and control unit 23 is disclosed. The collection and the determination for the driving information are performed (Step S01), wherein the driving information includes the environmental information 216, the absolute positioning information 217, the map data 218, the vehicle movement information 219, and the follower driving information 300. When the driving information is determined as normal information (Step S02) or abnormal information (Step S03), the leader decision-making and control unit 23 performs a determination of control strategy (Step S04). When the driving information is determined as abnormal information in Step S03, the leader decision-making and control unit 23 further performs an abnormality processing (Step S04') during the determination of control strategy. After performing the determination of control strategy, the leader decision-making and control unit 23 performs a vehicle control to the leader 10 (Step S05).

Figure 6:
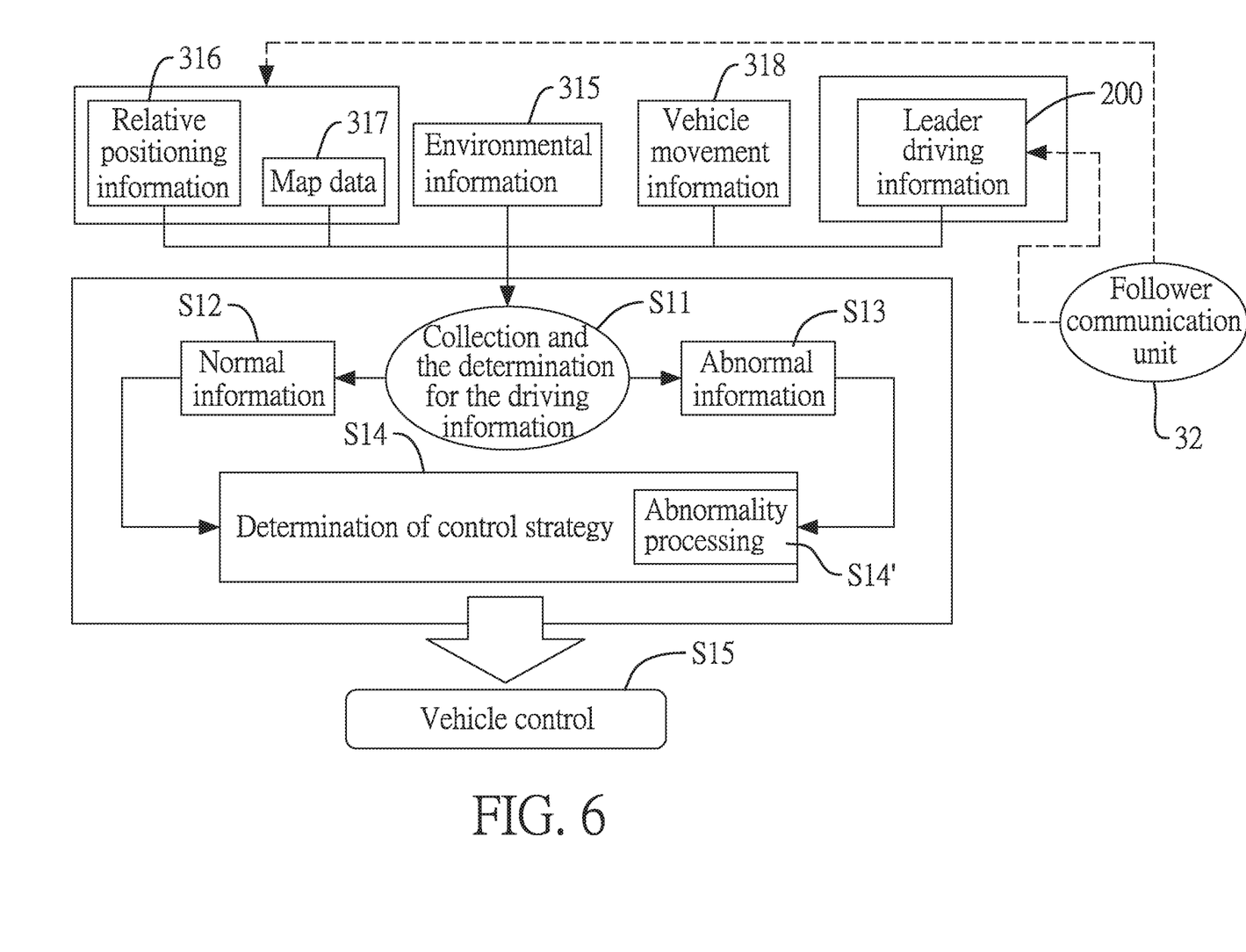
FIG. 6 is a flow chart of making a decision and control performed by the follower decision-making and control unit of the present invention.

Similarly, with reference to FIG. 6, a flow chart performed by the follower decision-making and control unit 33 is disclosed. The collection and the determination for the driving information are performed (Step S11), wherein the driving information includes the environmental information 315, the vehicle movement information 318, the map data 317, the relative positioning information 316, and the leader driving information 200. When the driving information is determined as normal information (Step S12) or abnormal information (Step S13), the follower decision-making and control unit 33 performs a determination of control strategy (Step S14). When the driving information is determined as abnormal information in Step S13, the follower decision-making and control unit 33 further performs an abnormality processing (Step S14') during the determination of control strategy. After performing the determination of control strategy, the follower decision-making and control unit 33 performs a vehicle control to the first follower (Step S15).

Figure 7:
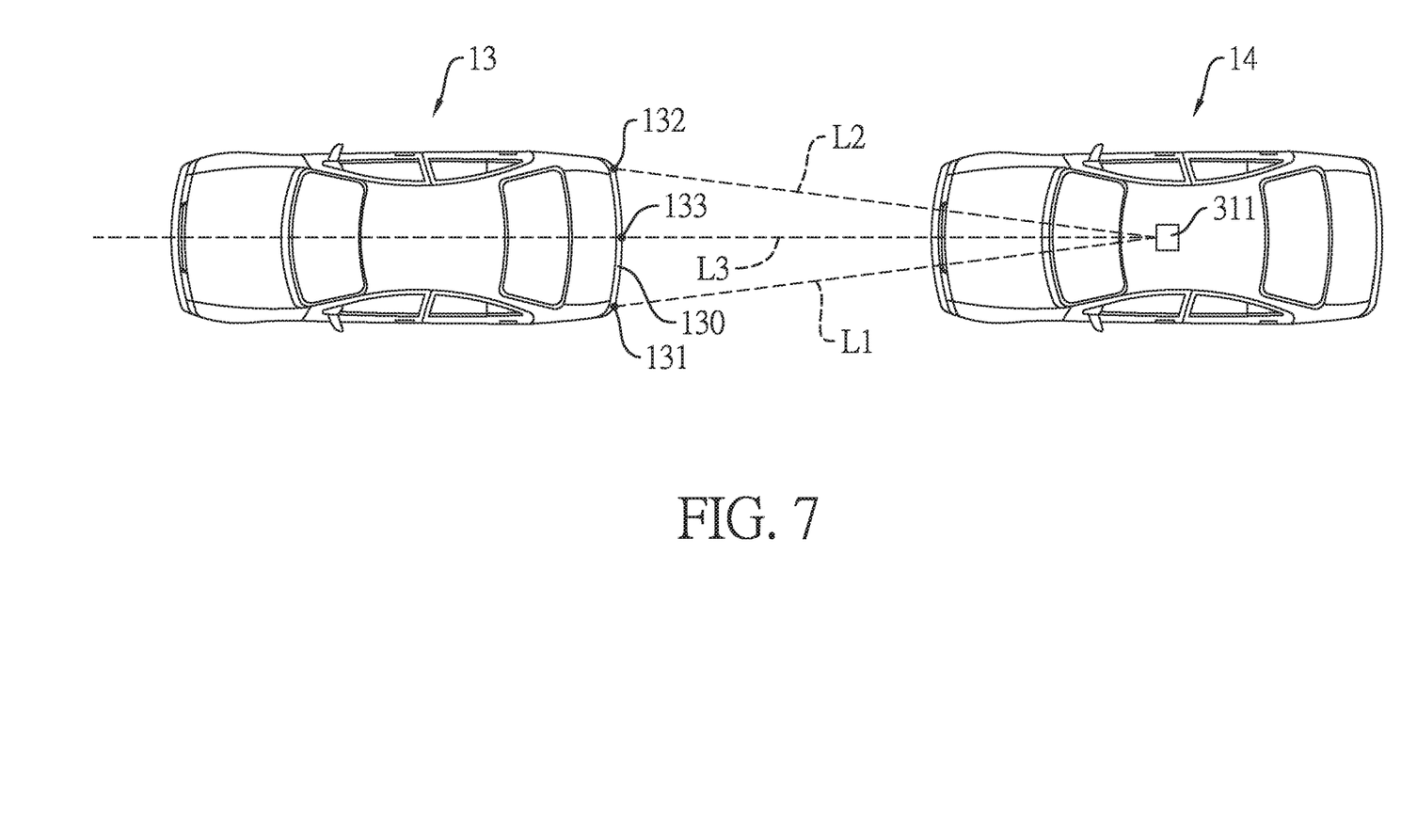
FIG. 7 is a schematic diagram showing the leader and the follower following the leader.

The relative positioning information 316 determined by the follower decision-making and control unit 33 is introduced by an example as follows. With reference to FIG. 7, a first vehicle 13 and a second vehicle 14 are disclosed. The second vehicle 14 follows the first vehicle 13, such that the second vehicle 14 is the follower and the first vehicle 13 may be the leader or another follower. In the example, the first vehicle 13 is the leader. The second vehicle 14 is equipped with the follower control device 30. The follower two-dimensional LiDAR sensor 311 of the simplified collecting unit 31 may scan the back (including the rear bumper 130) of the first vehicle 13 to obtain relative coordinates (relative to the second vehicle 14) of the contour of the back of the first vehicle 13, and such relative coordinates are provided to the follower decision-making and control unit 33. Then the follower decision-making and control unit 33 may receive a left-side coordinate 131, a right-side coordinate 132, and a middle coordinate 133 of the rear bumper 130 from the relative coordinates. Besides, the follower decision-making and control unit 33 in the second vehicle 14 may receive the absolute positioning information 217 of the first vehicle 13. The follower decision-making and control unit 33 may determine a relative positioning information 316 of the second vehicle 14 relative to the first vehicle 13 by performing a coordinate transformation to the absolute positioning information 217 and the middle coordinate 133.

Furthermore, the follower decision-making and control unit 33 may estimate a contour variation of the first vehicle 13 based on the coordinates 131, 132, 133 and determine whether the first vehicle 13 turns left or right according to the contour variation. In the embodiment, the follower decision-making and control unit 33 may estimate a first distance L1 between the second vehicle 14 and a left of the rear bumper 130 of the first vehicle 13 according to the relative positioning information 316 of the second vehicle 14 and the left-side coordinate 131, estimate a second distance L2 between the second vehicle 14 and a right of the rear bumper 130 of the first vehicle 13 according to the relative positioning information 316 of the second vehicle 14 and the right-side coordinate 132, and estimate a third distance L3 between the second vehicle 14 and the first vehicle 13 according to the relative positioning information 316 of the second vehicle 14 and the middle coordinate 133.

Figure 8:
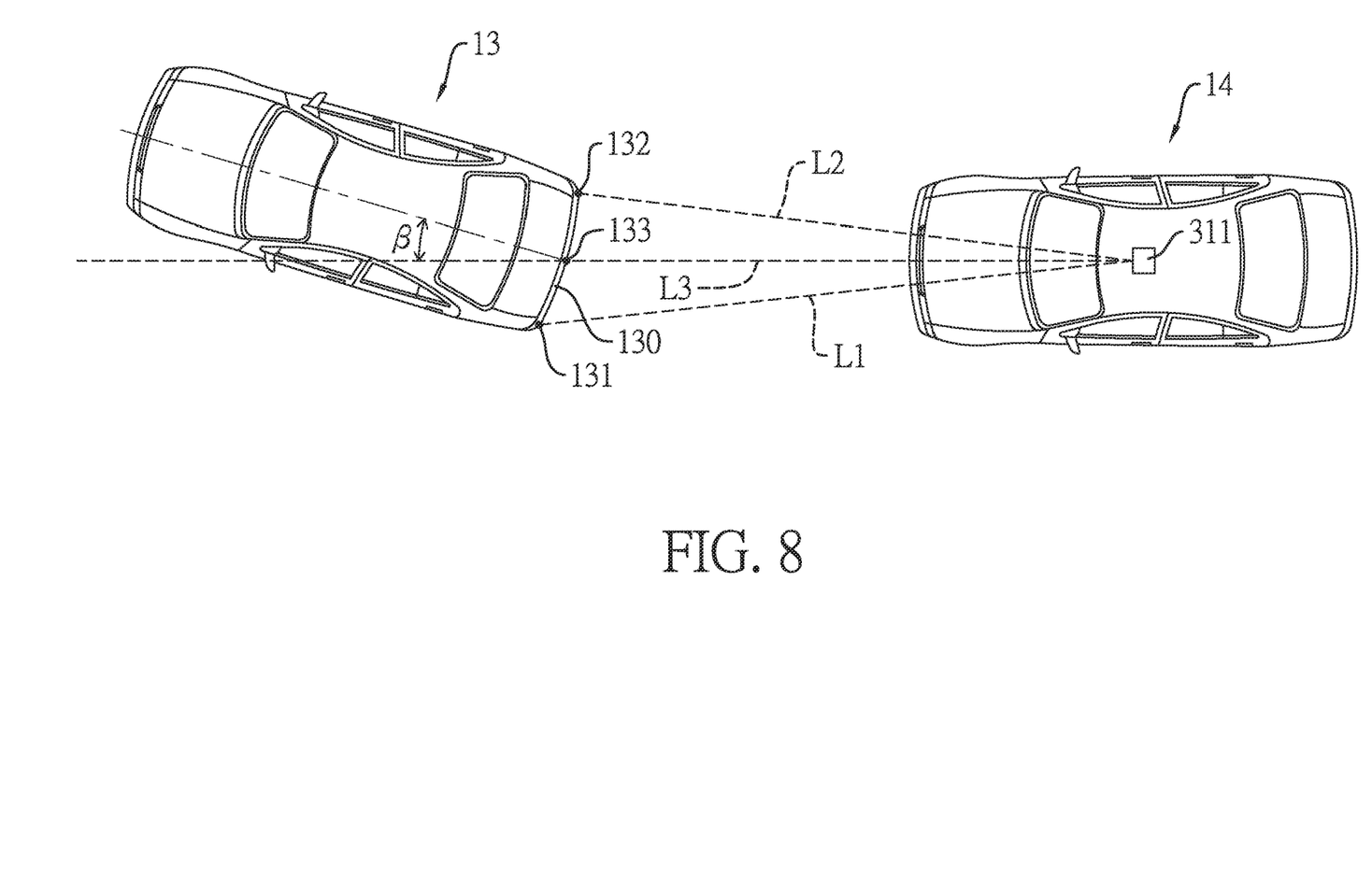
FIG. 8 is a schematic diagram showing the leader turning and the follower following the leader.

When the first distance L1 is equal to the second distance L2, the second vehicle 14 and the first vehicle 13 keep driving straight. When the first distance L1 is longer or shorter than the second distance L2, the first vehicle 13 is turning right or left. For example, with reference to FIG. 8, the variation between the first distance L1 and the second distance L2 is directly proportional to the turning angle β of the first vehicle 13. When the first distance L1 is longer than the second distance L2, the first vehicle 13 is turning right. Hence, by computing the distances L1-L3, the follower decision-making and control unit 33 may determine the instant relative movement of the first vehicle 13 to perform corresponding vehicle controls to the second vehicle 14. As mentioned above, the present invention costs lower in the simplified collecting unit 31 to achieve the goal of efficient vehicle following.

Figure 9:
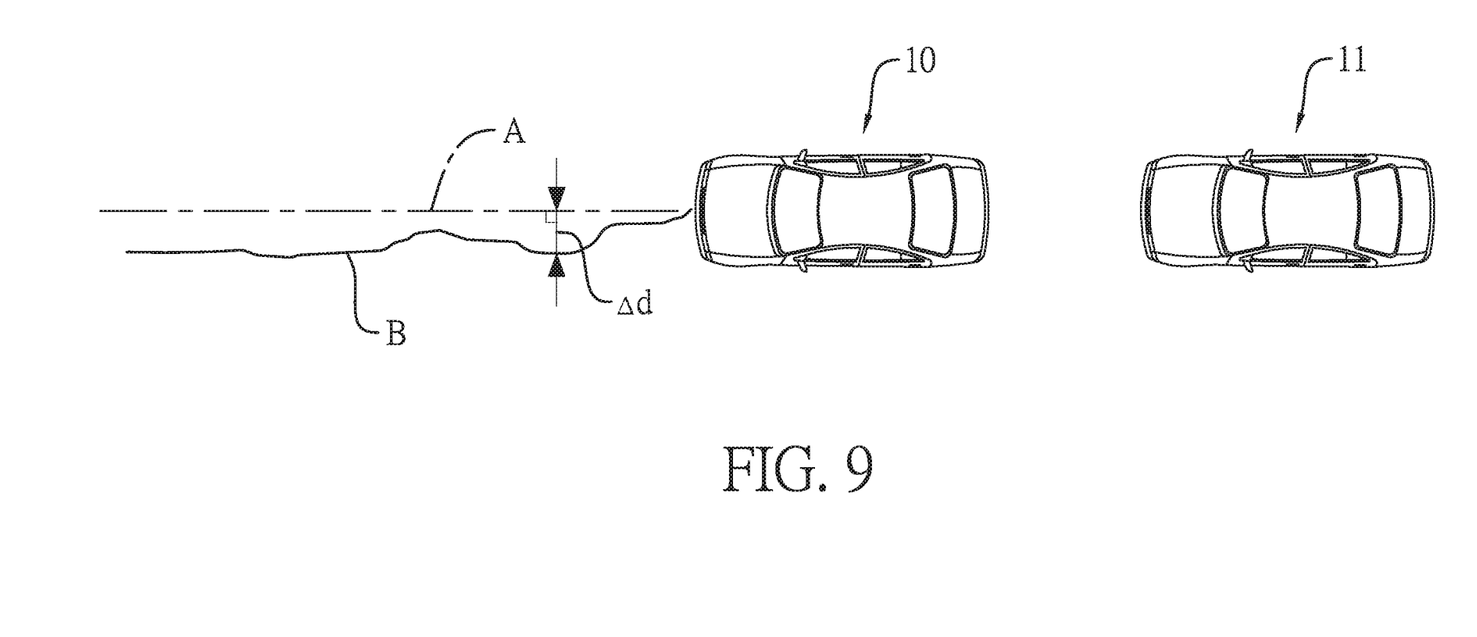
FIG. 9 is a schematic diagram showing a shift error between the actual moving path and the commanded path.
Figure 10:
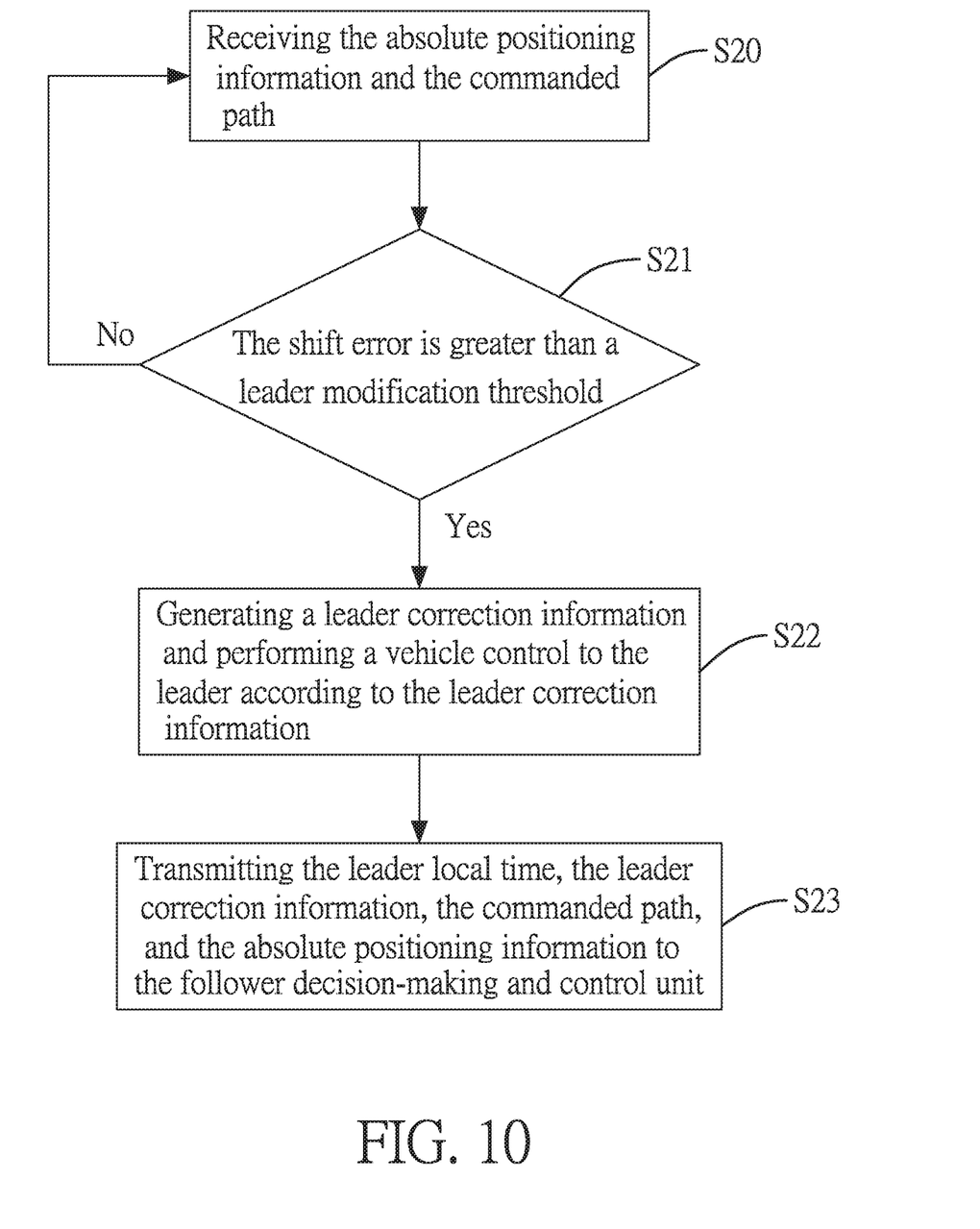
FIG. 10 is a flow chart performed by the leader decision-making and control unit of the present invention.

With reference to FIGS. 2 and 9, although the leader decision-making and control unit 23 steers the leader 10 according to the commanded path A, the leader 10 may physically deviate from the commanded path A. As a result, a shift error Δd occurs between an actual moving path B of the leader 10 and the commanded path A. With reference to FIG. 10, the leader decision-making and control unit 23 receives the absolute positioning information 217 and the commanded path A (Step S20), and then determines whether the shift error Δd is greater than a leader modification threshold by comparing the absolute positioning information 217 with the commanded path A (Step S21). For example, the leader modification threshold may be one meter long. When the shift error Δd is greater than the leader modification threshold, the leader decision-making and control unit 23 generates a leader correction information and performs a vehicle control to the leader 10 according to the leader correction information (Step S22). For example, the coordinate value of the absolute positioning information 217 may be subtracted by the coordinate value of the commanded path A. When the result of the subtraction is negative, which means the absolute positioning information 217 is determined at the right side of the commanded path A, the leader decision-making and control unit 23 may control the leader 10 to turn left as a modification, wherein the leader correction information includes a turning-left angle. On the contrary, when the absolute positioning information 217 is determined at the left side of the commanded path A, the leader decision-making and control unit 23 may control the leader 10 to turn right as the modification, wherein the leader correction information includes a turning-right angle. Besides, the leader decision-making and control unit 23 also transmits the leader local time, the leader correction information, the commanded path A, and the absolute positioning information 217 to the follower decision-making and control unit 33 (Step S23).

Figure 11:
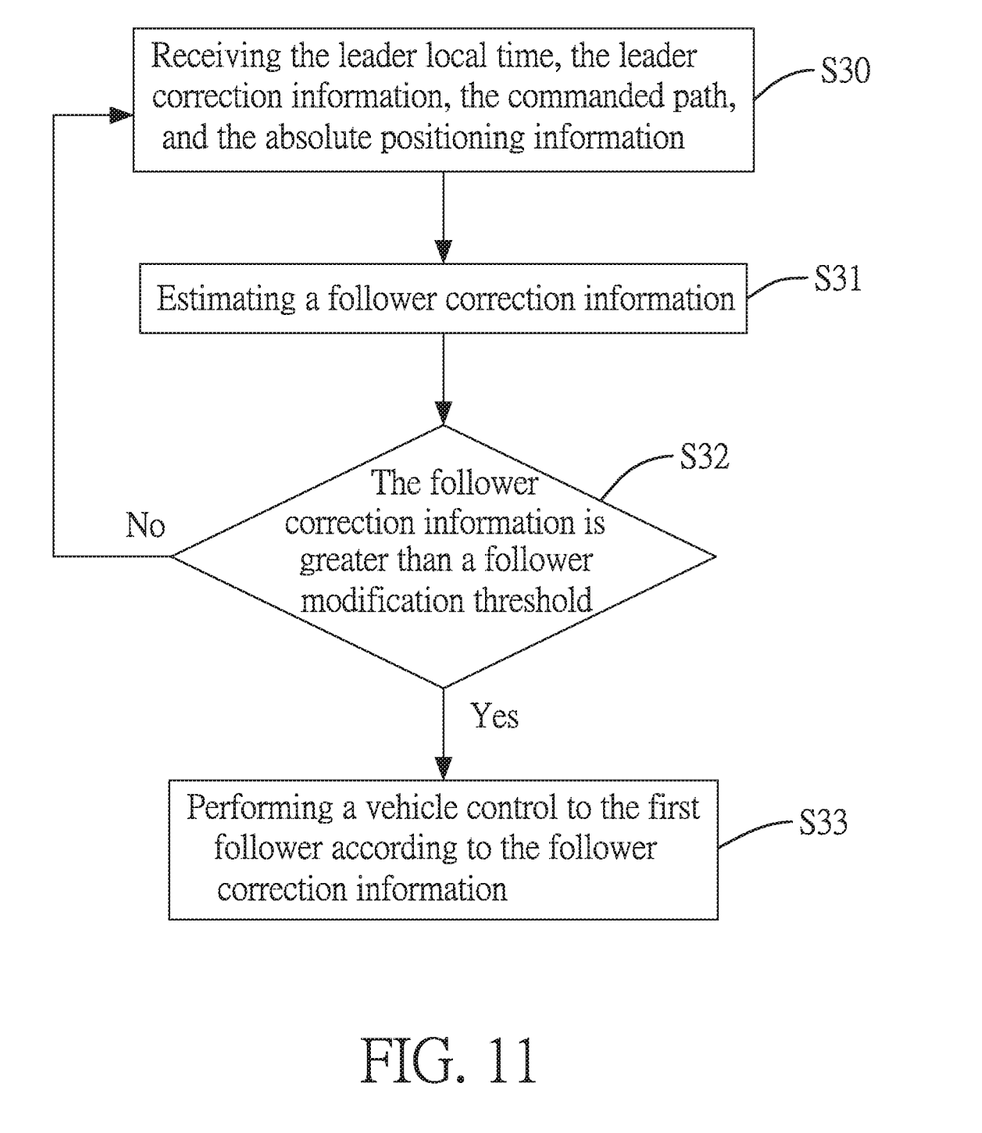
FIG. 11 is a flow chart performed by the follower decision-making and control unit of the present invention.

Further referring to FIG. 11, when the follower decision-making and control unit 33 receives the leader local time, the leader correction information, the commanded path A, and the absolute positioning information 217 (Step S30), the follower decision-making and control unit 33 estimates a follower correction information (Step S31) according to receptions of the leader local time, the leader correction information, the commanded path A, and the absolute positioning information 217. For example, the follower decision-making and control unit 33 may subtract the value of the received leader local time from the value of the instant follower local time to obtain a time shift, that is, the first follower 11 is expected to arrive at a predicted location when the time shift and the predicted location correspond to the received absolute positioning information 217. Afterwards, the follower decision-making and control unit 33 compares the predicted location with the map data 317 and the commanded path A to determine the follower correction information. The follower correction information includes a turning angle for the first follower 11 to move to the predicted location from the relative positioning information 316. After the follower correction information is determined, the follower decision-making and control unit 33 determines whether the follower correction information is greater than a follower modification threshold (Step S32). For example, the turning angle of the follower correction information may be 10 degrees. When the follower correction information is greater than the follower modification threshold, the follower decision-making and control unit 33 performs a vehicle control to the first follower 11 according to the follower correction information (Step S33). When the follower correction information is lower than the follower modification threshold, the follower decision-making and control unit 33 may not modify the instant moving path of the first follower 11. Therefore, the present invention may not over modify the first follower 11, such that the passengers in the first follower 11 would not feel uncomfortable.

In conclusion, the driving information is transmitted among the leader control device 20, the follower control device 30, and the server 30 for the purpose of coordination. Because the follower control unit 30 has the simplified collecting unit 31 that is less costly, the followers in the all-self-driving vehicle fleet may economically follow the leader.

What is claimed is:

1. A self-driving coordination control method performed by a self-driving coordination system applied to an all-self-driving vehicle fleet having a leader and a follower, wherein
    the leader goes forward along a commanded path and the follower follows the leader;
    the self-driving coordination system comprises a leader control device mounted in the leader and a follower control device mounted in the follower;
    the leader control device comprises an advanced collecting unit, a leader communication unit, and a leader decision-making and control unit; and
    the follower control device comprises a simplified collecting unit, a follower communication unit, and a follower decision-making and control unit;
the self-driving coordination control method comprising:
    receiving a follower driving information of the follower by the leader decision-making and control unit;
    receiving a leader driving information of the leader by the follower decision-making and control unit;
    receiving the leader driving information and the follower driving information by a server; and
    driving the follower by the follower decision-making and control unit according to the leader driving information, wherein
    the advanced collecting unit comprises
        a three-dimensional light detection and ranging sensor,
        a leader two-dimensional light detection and ranging sensor,
        a leader camera,
        a real-time kinematic sensor, and
        a leader inertial measurement unit;
    the simplified collecting unit includes four or less than four selected from the group consisting of
        a follower two-dimensional light detection and ranging sensor,
        a follower camera,
        a low-cost real-time kinematic sensor, and
        a follower inertial measurement unity;
    the simplified collecting unit comprises a follower distance sensor scanning a rear bumper of the leader to obtain a left-side coordinate, a right-side coordinate, and a middle coordinate of the rear bumper of the leader;
    the leader decision-making and control unit transmits an absolute positioning information from the leader driving information of the leader to the follower decision-making and control unit, wherein the absolute positioning information is estimated according to an absolute position coordinate of the leader provided by the real-time kinematic sensor of the advanced collecting unit and an attitude of the leader provided by the leader inertial measurement unit of the advanced collecting unit;
    the follower decision-making and control unit obtains a relative positioning information of the follower relative to the leader according to the absolute positioning information of the leader and the middle coordinate;
    the follower decision-making and control unit estimates a first distance between the follower and a left of the rear bumper of the leader, according to the relative positioning information and the left-side coordinate;
    the follower decision-making and control unit estimates a second distance between the follower and a right of the rear bumper of the leader according to the relative positioning information and the right-side coordinate; and
    when the follower decision-making and control unit determines that the first distance is longer or shorter than the second distance, performing a vehicle control to the follower.

2. The self-driving coordination control method of claim 1, wherein the follower distance sensor is an optical distance sensor.

3. The self-driving coordination control method of claim 1, wherein the follower distance sensor is a follower two-dimensional LiDAR sensor.

4. The self-driving coordination control method of claim 1, wherein
    the leader decision-making and control unit determines whether a shift error between an actual moving path formed by the absolute positioning information and the commanded path is greater than a leader modification threshold;
    when the shift error is greater than the leader modification threshold, the leader decision-making and control unit generates a leader correction information and performs a vehicle control to the leader according to the leader correction information; and
    the leader decision-making and control unit transmits a leader local time, the leader correction information, the commanded path, and the absolute positioning information to the follower decision-making and control unit, wherein
    the leader correction information includes a turning-left angle and a turning-right angle, and
    the leader local time and a follower local time of the follower are synchronous to each other.

5. The self-driving coordination control method of claim 4, wherein
    the follower decision-making and control unit estimates a follower correction information according to the leader local time, the leader correction information, the commanded path, and the absolute positioning information;
    the follower decision-making and control unit determines whether the follower correction information is greater than a follower modification threshold;
    when the follower correction information is greater than the follower modification threshold, the follower decision-making and control unit performs a vehicle control to the follower according to the follower correction information; and
    the follower correction information includes a turning angle.

* * * * *